United States Patent

Hayashi et al.

Patent Number: 5,956,104
Date of Patent: Sep. 21, 1999

[54] ACTIVE MATRIX-TYPE LIQUID CRYSTAL DISPLAY DEVICE AND METHOD OF MAKING THE SAME

[75] Inventors: Hisaaki Hayashi; Sakae Yoshida, both of Hyogo-ken, Japan

[73] Assignee: Kabushiki Kaisha Toshiba, Kawasaki, Japan

[21] Appl. No.: 09/037,741

[22] Filed: Mar. 10, 1998

[30] Foreign Application Priority Data

Mar. 10, 1997 [JP] Japan ..................... 9-054736

[51] Int. Cl.$^6$ ........................................ G02F 1/136
[52] U.S. Cl. .................................. 349/42; 349/43
[58] Field of Search .................. 349/42, 43, 46

[56] References Cited

U.S. PATENT DOCUMENTS

| | | | |
|---|---|---|---|
| 5,532,850 | 7/1996 | Someya et al. | 349/46 |
| 5,541,748 | 7/1996 | Ono et al. | 349/42 |
| 5,621,556 | 4/1997 | Fulks et al. | 349/43 |
| 5,815,223 | 9/1998 | Watanabe et al. | 349/43 |

FOREIGN PATENT DOCUMENTS 64-35422  2/1989  Japan.

*Primary Examiner*—William L. Sikes
*Assistant Examiner*—James A Dudek
*Attorney, Agent, or Firm*—Pillsbury Madison & Sutro LLP

[57] ABSTRACT

An active matrix-liquid crystal display device includes an array substrate 100 on which pixel electrodes 151, signal lines 103 with first and second conductive layers 103a and 103b are formed. The first conductive layers 103a and the pixel electrodes 151 are subject to patterning using a same mask in a same optical exposure process. The first conductive layers 103a are wider in width than the second conductive layers 103b. The pixel electrodes 151 and the signal lines 103 maintain constant relative positions on display areas thereby to hardly cause unevenness of resultant images and to enable the device to display better dignity images.

14 Claims, 5 Drawing Sheets

ACTIVE MATRIX-TYPE LIQUID CRYSTAL DISPLAY DEVICE AND METHOD OF MAKING THE SAME

BACKGROUND OF THE INVENTION

Field of the Invention

This invention relates to an active matrix-type liquid crystal display device and a method of making the same. More particularly, it relates to a novel structure of wiring, such as signal lines and scanning lines, and pixel electrodes formed on an array substrate and a manufacturing process for it.

An active matrix-type liquid crystal display device is provided with an array substrate, a counter substrate disposed opposite to the array substrate, alignment layers formed on the array and counter substrates, respectively, and a liquid crystal composition held between the substrates through the alignment layers. The array substrate includes an isolation substrate, such as a glass substrate, a plurality of signal and scanning lines made of low electric resistance materials, such as aluminum, in matrices, thin film transistors (TFTs) provided at cross points of the signal and scanning lines, respectively, and indium tin oxide (ITO) pixel electrodes connected to the TFTs. An isolation layer is interposed between the scanning lines and the pixel electrodes to define storage capacitors. The surface of the array substrate is covered with the alignment layer to align the liquid crystal composition.

The active matrix-type liquid crystal device of this sort is generally manufactured in the following processes. In the first step a predetermined composition layer, e.g., an ITO layer is formed on a glass substrate by sputtering or chemical vapor deposition (CVD). In the second step a photoresist is coated on the ITO layer. The photoresist is optically exposed through a photomask with a predetermined pattern in the third step. The photoresist is selectively removed from the ITO layer by developing in order to transfer the pattern thereto in the fourth step. The layers under the photoresist are subject to etching, e.g., wet or dry etching through the remaining photoresist. As a result, the mask pattern is formed on the layers in the fifth step. Finally, the remaining photoresist already used as a mask is removed from the ITO layer so that the pattern defining steps are completed.

A plurality of composition layers with a predetermined pattern are formed on an array substrate through repeating such layer forming processes a prescribed numbers of times. In the processes for manufacturing an array substrate set forth above, a plurality of masks are necessarily used for separate exposure steps to make a predetermined pattern on a same layer. In other words, since one sheet of photomask cannot cover a liquid crystal display device pattern in the case of a larger array substrate in accordance with a larger display area of a liquid crystal display device, a display area is divided into a plurality of optical exposure regions and optical exposure is performed for each of the optical exposure regions in patterning each layer.

When an optical exposure is performed for patterning a plurality of exposure regions divided in a display area, one after the other, on an array substrate as described above, the patterning accuracy depends largely on positioning errors of the optical exposure device used for the patterning processes. In short, after a first wiring pattern made of a first layer has been formed on an array substrate as a reference pattern, a second wiring pattern made of a second layer is formed. The second pattern may have relative positioning deviations with respect to the reference pattern in each of the divided exposure regions due to the positioning error of the exposure device.

When pixel electrodes made of an ITO layer as reference patterns are combined with the second wiring (signal line) pattern of an aluminum material, the exposure regions differ in distances defined between the pixel electrodes and the signal lines.

The wiring patterns formed in different process steps may cause relative positioning deviations in each of the exposure regions. Since electric force lines are distributed between the first and adjacent second wiring patterns formed on the isolation layer, a parasitic capacitance is defined between them in response to the density of electric force lines. In the above case, a parasitic capacitance is defined between the signal line and the pixel electrode.

Where the distance between the pixel electrode and the signal line is different from one of the exposure regions to another, they differ in the density of electric force lines and the capacitance defined between them from each other. As a result, effective voltages applied to the liquid crystal layer differ in each exposure region so that the brightness of the exposure regions is different from each other and boundaries between the regions appear on the display area. This leads to a problem of a poor quality display which is referred to as the unevenness of combined images.

SUMMARY OF THE INVENTION

One object of the present invention is to provide a liquid crystal display device which hardly causes the unevenness of combined images and a method of manufacturing the same.

An active matrix-type liquid crystal display device of this invention includes an array substrate, a counter substrate provided opposite to the array substrate, and a liquid crystal layer held between the array and counter substrates. The array substrate is provided with switching elements, such as thin film transistors, a plurality of electrically conductive lines connected to the switching elements, and a plurality of pixel electrodes connected to the switching elements.

Either component of the conductive lines or the pixel electrodes is made of first and second layers. Importantly, the other component not selected from them and the first layer are formed by a same patterning process using a same mask. With this structure, the electric coupling between the conductive lines and the pixel electrodes is substantially determined by relative positions between the first layer and the one not selected. Thus, in the event of a position shift with respect to the second layer, it does not affect the coupling critically. The first layers may be wider in width than the second layers while the second layers may be formed within the width of the first layer. Alternatively, the first layer may be formed to cover or wrap the edge of the second layer so that the mutual position can be kept constant between the conductive lines and the pixel electrodes.

More particularly, the conductive lines consist of signal and scanning lines. They are disposed to cross each other on the array substrate. The signal lines are made of first and second conductive layers. The first conductive layers and the pixel electrodes are formed by a patterning process using a same mask.

Alternatively, the pixel electrodes are made of first and second conductive layers. The first conductive layers and the signal lines are formed by a patterning process using a same mask.

A method of manufacturing an active matrix-type liquid crystal display device of the present invention includes the steps of making an array substrate, a counter substrate provided opposite to said array substrate, a liquid crystal layer held between said array and counter substrates, switching elements on said array substrate, a plurality of electrically conductive lines on said array substrate; and a plurality of pixel electrodes on said array substrate.

The conductive lines and the pixel electrodes are connected to the switching elements. One component selected from the components consisting of the conductive lines and the pixel electrodes is made of first and second conductive layers. The other component not selected from the components and the first layer are formed by a patterning process using a same mask. With this process, the electric coupling between the conductive lines and the pixel electrodes is substantially determined by relative positions between the first layer and the one not selected. Thus, in the event that a position shift of the second layer takes place, it does not critically affect the coupling. The first layers may be wider in width than the second layers while the second layers may be formed within the width of the first layer. Alternatively, the first layer may be formed to cover or wrap the edge of the second layer so that the mutual position can be kept constant between the conductive lines and the pixel electrodes.

The first layer is wider in width than the second layer. The second layer is formed within the width of the first layer.

Particularly, the method of manufacturing an active matrix-type liquid crystal display device set forth above is characterized in the steps of making thin film transistors on a array substrate, a plurality of electrically conductive signal lines on the array substrate, a plurality of electrically conductive scanning lines on the array substrate, and a plurality of pixel electrodes on the array substrate.

Further, the signal and scanning lines and the pixel electrodes are connected to the thin film transistors. The signal and scanning lines are disposed to cross each other. The signal lines are made of first and second layers. The first layers and the pixel electrodes are formed by a patterning process using a same mask.

Alternatively, a method of manufacturing an active matrix-type liquid crystal display device includes the steps of making the pixel electrodes made of first and second conductive layers, the first layers and the signal lines formed by a same patterning process using a same mask.

The manufacturing method of the present invention is also suitable for manufacturing a large display area on a glass sheet which is divided into a plurality of regions. Separate exposure processes are applied to them, respectively. Since the first layer of either component selected from the conductive lines and the pixel electrodes and another component not selected therefrom are formed by a patterning process using the same mask as set forth above, mask position shifts do not affect the coupling critically in the case of the separate exposure processes.

According to an active-matrix type liquid crystal display device and a method of manufacturing the same of the present invention, where each layer is formed on an array substrate by separating it into a plurality of exposure regions and by application of optical exposure thereto, the distance between pixel electrodes and wiring is kept substantially constant in each region so that there is no substantial phenomenon in which parasitic capacitance varies from one region to another. The present invention is capable of suppressing unevenness of combined images caused by different brightness of each display region corresponding to its exposure region.

The above-stated and other objects and technical features of the present invention will become apparent from the following description when taken with the accompanying drawings. It will be understood, however, that the drawings are for purposes of illustration and are not to be construed as defining the scope of the invention, reference being had for the latter purpose to the claims appended hereto.

DETAILED EXPLANATION OF THE PREFERRED EMBODIMENT

An active matrix-type liquid crystal display device of this invention will be explained hereinafter with reference to the drawings. In this embodiment, the active matrix-type liquid crystal display device includes, by way of example, a normally white mode, light transmission type liquid crystal element.

This active matrix-type liquid crystal display device includes an array substrate, a counter substrate provided opposite to the array substrate, alignment layers coated on the array and counter substrates, respectively, and a liquid crystal composition held between the substrates through the alignment layer.

The array substrate is provided with an insulation substrate, such as a glass substrate 100, 1024X3 signal lines 103 and 768 scanning lines 111 crossing the signal lines at right angles. The scanning lines 111 made of low electric resistance materials, such as aluminum (Al) and molybdenum tungsten (MoW), are formed under an insulation layer 113 made of multi-layers of silicon oxide and silicon nitride coated on the glass substrate 101.

The array substrate 100 is also provided with thin film transistors (called hereinafter the "TFTs") 121 provided in the vicinities of the crossing points of the signal and scanning lines 103 and 111 and pixel electrodes 151 connected to the TFTs. The pixel electrodes 151 are made of optically transparent, electrically conductive materials, such as an indium tin oxide film.

Figure 1:
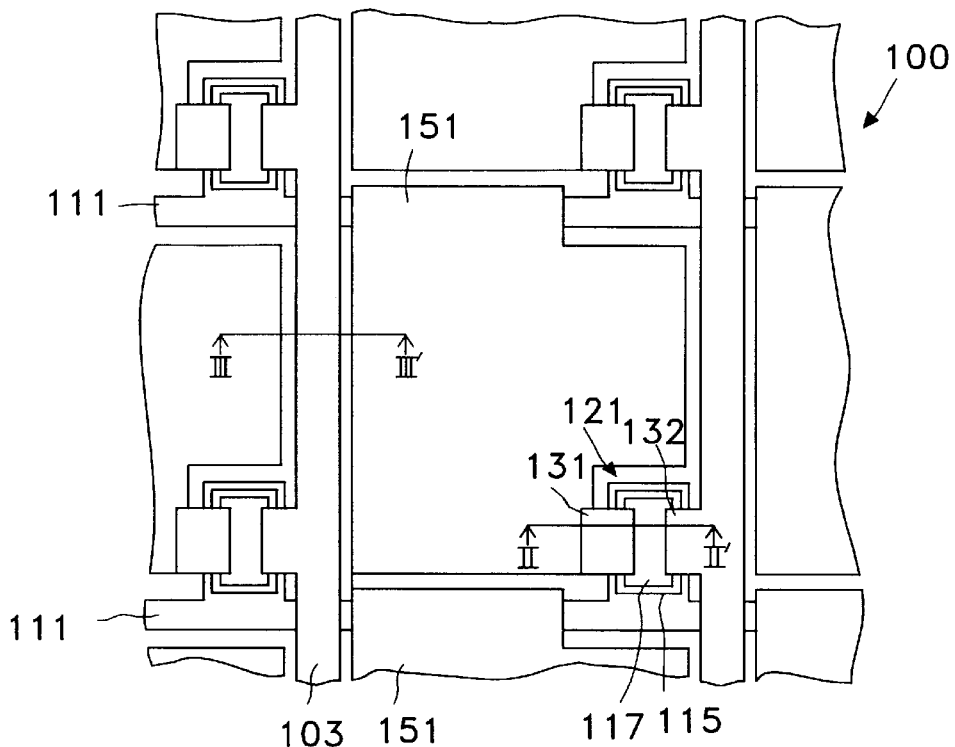
FIG. 1 is a schematic layout plan view of an array substrate provided in an active matrix-type liquid crystal display device of this invention.
Figure 2:
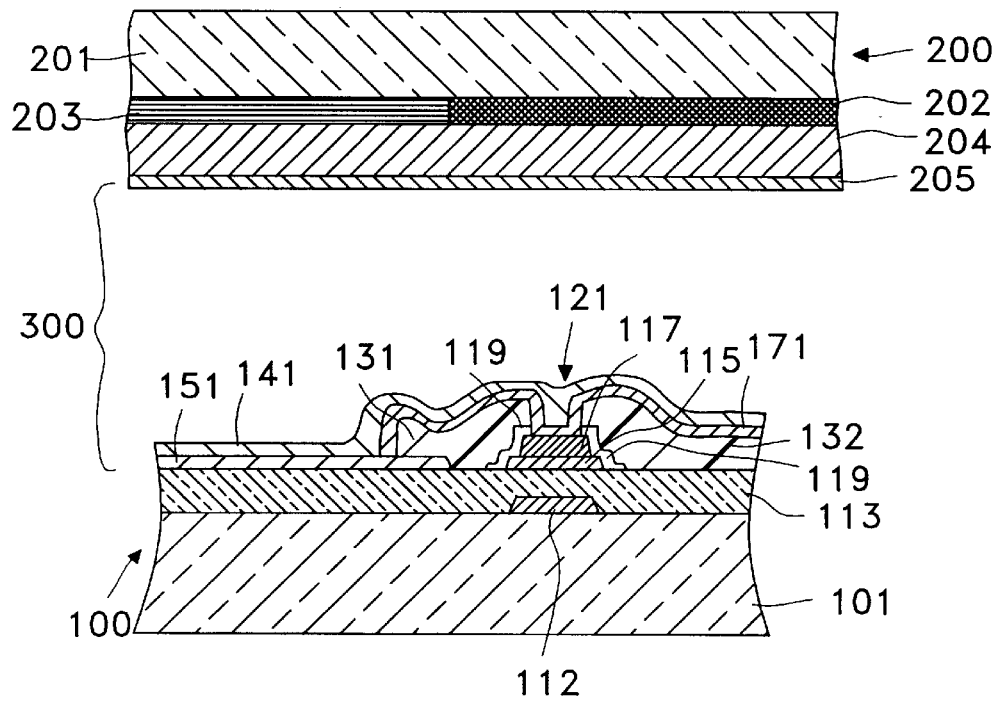
FIG. 2 is a sectional view taken from line II–II' of the array substrate shown in FIG. 1 and one of a counter substrate corresponding thereto.

As seen from FIGS. 1 and 2, the TFT 121 has a gate electrode 112 branching off from the scanning line 111 on which a gate insulation layer 113 is formed. A semiconductor layer 115 of a-Si: H film is laminated on the gate electrode 112. Further, a channel protection layer 117 is laminated on the semiconductor layer 115.

The semiconductor layer 115 is connected to a low resistance semiconductor layer 119 made of an n+ type a-Si layer and a source electrode 131 which is connected to the pixel electrode 151. The semiconductor layer 115 is connected to the signal line 103 through the low resistance semiconductor layer 119 and a drain electrode 132 extended from the signal line 103.

In the TFT 121, the channel protection layer 117, the source electrode 131 and the drain electrode 132 are covered by the protection layer 171.

Figure 3:
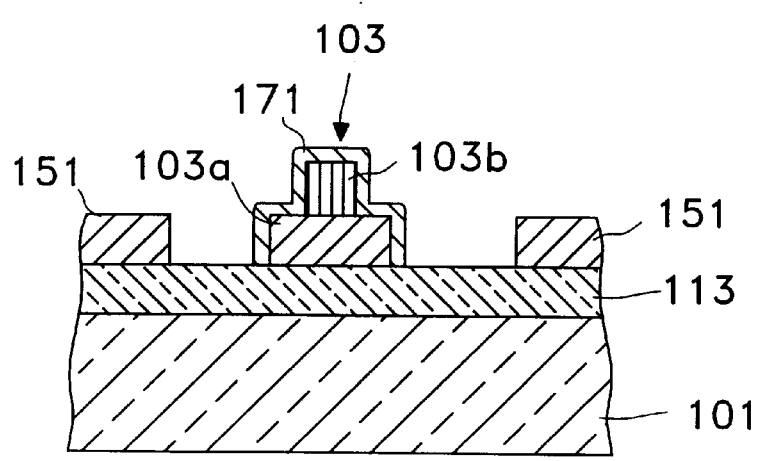
FIG. 3 is a sectional view taken from line III–III' of part of the array substrate shown in FIG. 1.

The pixel electrode 151 is overlapped with the scanning line 111 through the isolation layer 113 as shown in FIGS. 1 and 2 to define a storage capacitor (Cs). The signal line 103 is made of a plurality of layers, e.g., double layers as shown in FIG. 3. Namely, the signal line 103 has a first ITO layer 103a formed on the isolation layer 113 as of the pixel electrode 151 and a second aluminum layer 103b laminated on the first layer 103a.

The first layer 103a of the signal line 103 is made wider in line-width than the second layer 103b. The first layer 103a is formed by patterning through the same mask as used for the pixel electrode 151. The mask is designed to position the first layer approximately in the center of neighboring pixel electrodes 151.

The edge of the first layer 103a is designed to be positioned between the edges of the second layer 103b and the pixel electrode 151. In other words, the second layer 103b is firmly formed on the first wider layer 103a without jutting out therefrom.

The first layer 103a of the signal line 103 and the pixel electrode 151 are formed in the same layer on the isolation layer 113 by using the same mask. Thus, the distance between them can be kept substantially constant all over the optical exposure regions. The density of electric force lines between the signal lines 103 and the pixel electrodes 151 are substantially the same all over the regions so that the same parasitic capacitance is substantially defined between the signal lines 103 and the pixel electrodes 151.

The surface of the array substrate 100 is covered by the alignment layers 141 to align liquid crystal molecules in the liquid crystal compositions in a direction. The counter electrode 200 is provided with light blocking layers 202 formed on a transparent isolation layer, such as a glass substrate 201, to shield it from light areas corresponding to gaps between the TFT 121 and the signal line 103, the pixel electrode 151 and the signal line 103, and the pixel electrode and the scanning line 111. The light blocking layers 202 are made of chrome films, for instance.

The counter substrate 200 is further provided with color filters 203 consisting of red (R), green (G) and blue (B) color stripes for color display disposed between the light blocking layers 202. The surface of the color filters 203 and light blocking layers 202 are covered by an ITO counter electrode 204.

The surface of the counter substrate 200 is covered by the alignment layer 205 to align the molecules of the liquid crystal compositions in a direction. Polarlizers (not shown) whose polarizing axes cross each other approximately in a right angle are provided on the front of the counter glass substrate 201 and the back surfaces of the array glass substrate 101, respectively. Each lead of the signal and scanning lines 103 and 111 taken out to one side thereof is connected to driver circuit boards (not shown) for supplying voltages to, and driving, the liquid crystal display elements through tape carrier packages.

The liquid crystal composition, e.g., a twisted nematic liquid crystal material, is enclosed between the array and counter substrates. The array substrate used for such an active matrix-type liquid crystal display device as explained above is formed in the following manufacturing steps.

First, a metal layer, such as MoW Layer, is formed on the glass substrate 101 by sputtering and a patterning process shapes the metal layer into a plurality of stripes so that the scanning lines 111 and the gate electrodes 112 are made. A predetermined thickness of the gate insulation layer 113, such as SiNx/SiOx layer, is then coated on the scanning lines 111 by a plasma enhanced chemical vapor deposition (PECVD) method.

The a-Si:H layer with a predetermined thickness is also formed on the gate insulation layer 113 by the PECVD method. The SiNx layer is further formed thereon by the PECVD method. The a-Si:H semiconductor layer 115 and the SiNx channel protection layer 117 is shaped by a patterning process applied thereto to position the a-Si:H layer over the gate electrode 112.

An n+ type a-Si:H layer is deposited on the semiconductor layer 115 and the channel protection layer 117 and patterning it makes the low electric resistance semiconductor layer 119. After the ITO layer is formed on the gate insulation layer 113, patterning the same makes the pixel electrodes 151, and the first layer 103a.

Coating and patterning an aluminum layer makes the source electrode 131 for connecting the TFT 121 to the pixel electrode 151 and the drain electrode 132 for connecting the signal line (the second layer 103b) to the TFT 121.

After forming the protection layer 171, the alignment layer 141 is formed on the surface of the array substrate 100. The manufacturing processes for the array substrate 100 of the active matrix-type liquid crystal display device is concluded.

Figure 5:
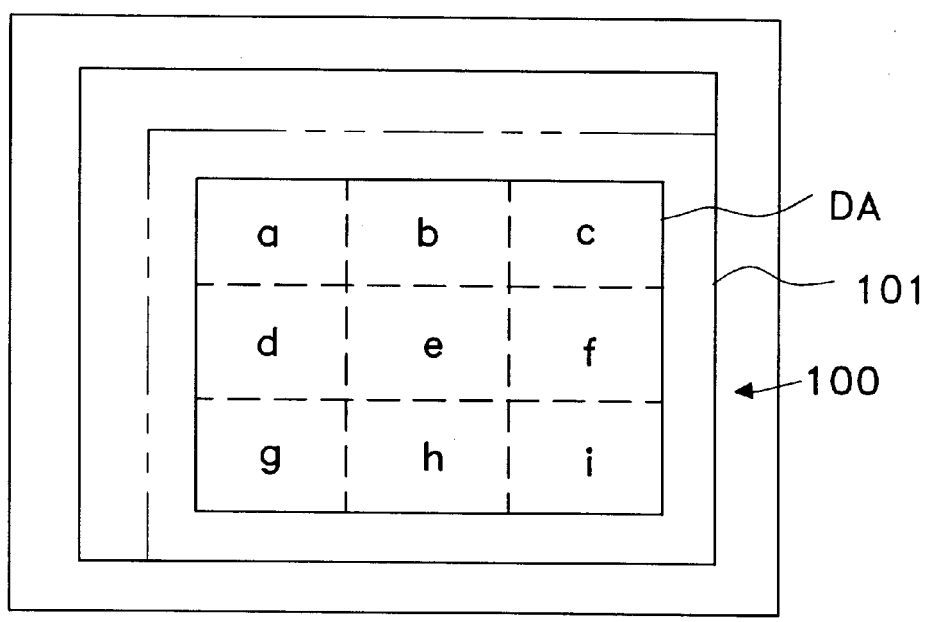
FIG. 5 is a schematic diagram for explanation of separate optical exposure applied to an active matrix-type liquid crystal display device with a large display area.
Figure 4A:
FIGS. 4A through 4F are schematic sectional views to show steps in a patterning process.
Figure 4B:
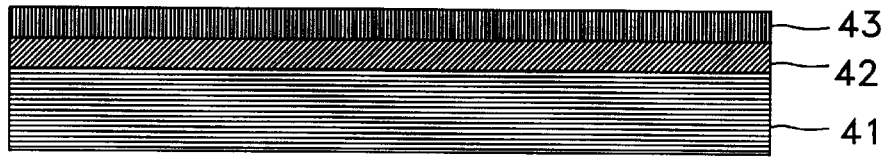
Figure 4B:
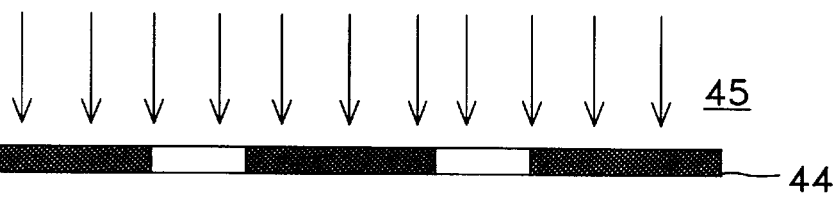
Figure 4C:
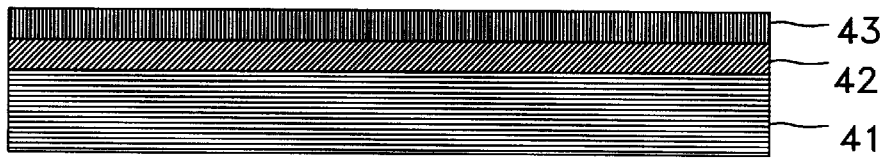
Figure 4D:
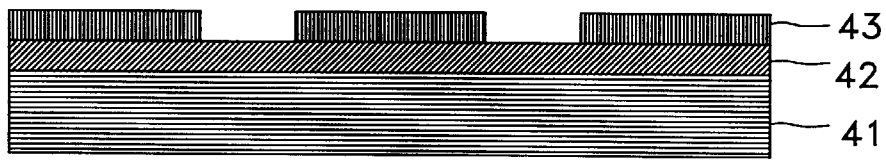
Figure 4E:
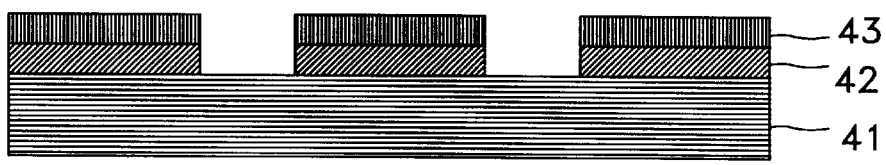
Figure 4F:
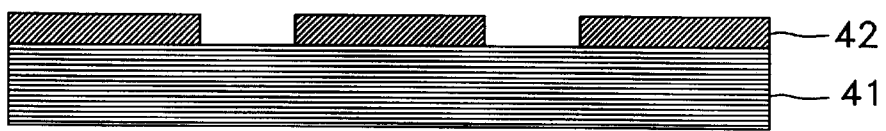

As shown in FIGS. 4A through 4F, the patterning set forth above in the manufacturing processes is performed in the following way. A layer or film, such as a metal layer 42, to be patterned is deposited on a substrate 41 (FIG. 4A). A photoresist 43 is coated on the metal layer 42 (FIG. 4B). An optical exposure 45 is carried out through a mask 44 with a predetermined pattern placed directly on, or over, the photoresist 43 (FIG. 4C). Developing the photoresist 43 makes it selectively removed therefrom 80 that the pattern is transferred to the photoresist 43 (FIG. 4D). Wet or dry etching is applied to the metal layer 42 by using the selectively removed photoresist 43 as a mask. As a result, the layer 42 is provided substantially with the same pattern as the mask (FIG. 4E). Finally, the remaining photoresist is removed from the layer 42 to complete the patterning (FIG. 4F).

Where the array substrate is made for a large size in which the display area of the liquid crystal display device is 10 inches or more in diagonal length, the display area DA of the array substrate is divided into 9 regions "a", "b", "c", ..., "i" as shown in FIG. 5. A photoresist is entirely coated on a layer of the display area but an optical exposure is performed for each region of the display area.

Figure 6:
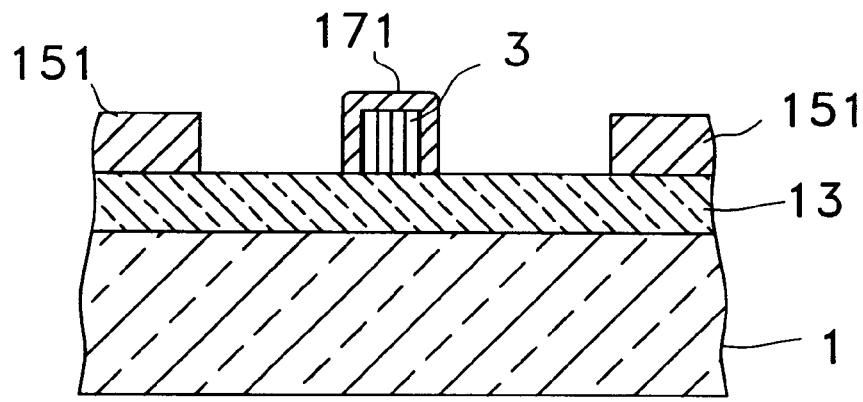
FIG. 6 is a sectional view of a signal line and pixel electrodes formed on an array substrate by a conventional manufacturing method.
Figure 7:
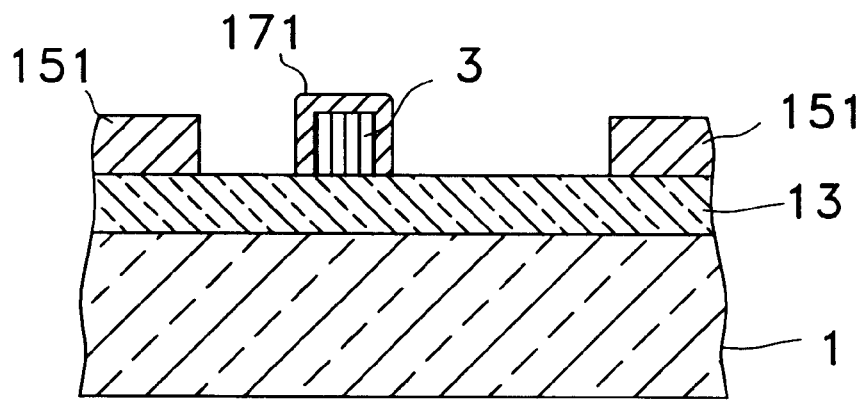
FIG. 7 is a sectional view of a signal line and pixel electrodes formed on an array substrate by a conventional manufacturing method.

As mentioned above, a signal line 3 is made of a single layer in a conventional technique as shown in FIGS. 6 and 7. This signal line 3 is subject to a patterning process separated from that for a pixel electrode 151. In short, the signal line 3 is made by patterning through a mask which is different from that used for patterning the pixel electrode 151.

The signal line 3 is designedly positioned in the center of the pixel electrodes 151 as shown in FIG. 6. The signal line 3, however, is not always positioned to have the same distance from the right and left pixel electrodes, respectively, due to mechanical positioning errors of optical exposure equipment. Thus, the signal line 3 is not positioned equally in distance from the center and much closer to one of the pixel electrodes. The distance between the signal line 3 and the right pixel electrodes is different from that between the signal line 3 and the left pixel electrode as shown in FIG. 7.

A relative position shift of this sort may be different from one of the regions to another in the case of manufacturing the large size display device shown in FIG. 5. The pixel electrode 151 and the signal line 3 of the regions "a" and "b" may have such structures as shown in FIGS. 6 and 7, respectively. In this particular example, since the distance in the region "a" between the pixel electrode and the signal line is different from that in the region "b", the regions "a" and "b" have different parasitic capacitance between the pixel electrode and the signal line.

With the structures mentioned above, the effective voltage applied to the liquid crystal composition varies from one region to another so that brightness difference is visible on the display area. In particular, when the brightness difference takes place between neighboring regions, e.g., those of "a" and "b", the boundary therebetween is distinctively visible and it results in display dignity deterioration referred to as the unevenness of resultant images.

Contrary to the conventional liquid crystal display device explained above, one embodiment of an active matrix-type liquid crystal display device of the present invention has a structure and a method to improve substantially the display dignity deterioration as apparent from descriptions hereinafter. The signal line 103 on the array substrate 100 has two laminated conductive layers as shown in FIG. 3. The first ITO layer 103a is made by the optical exposure using the same mask as for the pixel electrode 151. The second aluminum layer 103b is made by the optical exposure using a mask different from that used in the patterning process for the pixel electrode 151.

As mentioned above, the first layer 103a of the signal line 103 is subject to the patterning through the same optical exposure process using the same mask as for the pixel electrode 151. The mask is designed to position the first layer 103a approximately in the center of the area between neighboring pixel electrodes 151. The first layer 103a of the signal line 103 is wider in width than the second layer 103b.

Thus, if the relative position between the pixel electrode 151 and the second layer 103b are made in accordance with the separate patterning process due to mechanical positioning errors of the optical exposure machine, the distance between the pixel electrode 151 and the first layer 103a made in the same patterning process as for the pixel electrode 151 is substantially constant in all the regions, i.e., all the optical exposure regions.

Figure 8:
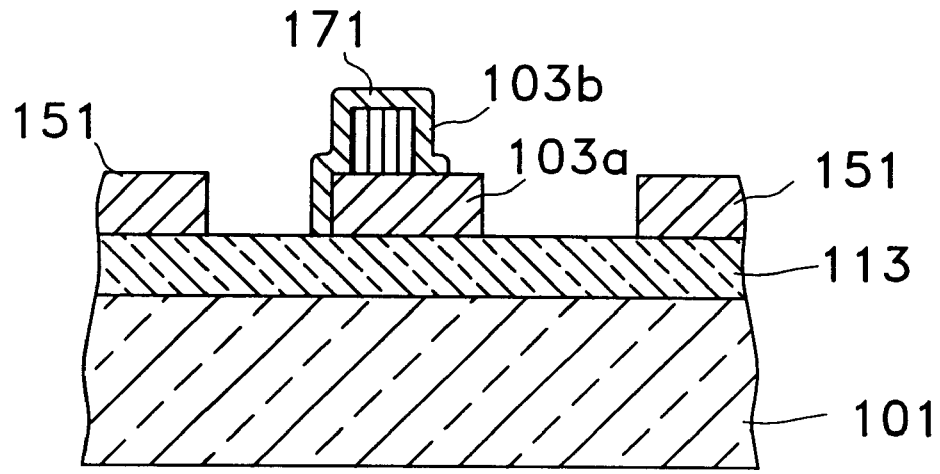
FIG. 8 is a sectional view of a signal line and pixel electrodes formed on an array substrate by a manufacturing method of this invention.

As shown in FIG. 8, where a position shift of the second layer 103 occurs more or less in the forming process thereof, the second layer 103b is still disposed on the first layer 103a which is wider in width than the second layer 103b. The tolerable position shift of the second layer 103b is within the scope in which the edge of the second layer 103b is not projected onto the pixel electrode side from the edge of the first layer 103a. So far as the edge of the second layer 103b is not disposed beyond that of the first layer 103a, the relative position or the distance between the signal line 103 and the pixel electrode 151 may be kept substantially constant.

Thus, the parasitic capacitance between the signal line 103 and the pixel electrode 151 is substantially fixed in every display area. This results in suppression of the brightness difference and supression of the unevenness of resultant images appeared between neighboring display areas corresponding to optical exposure regions. This embodiment can provide an active matrix-type liquid crystal display device with better display dignity.

0047

Figure 9:
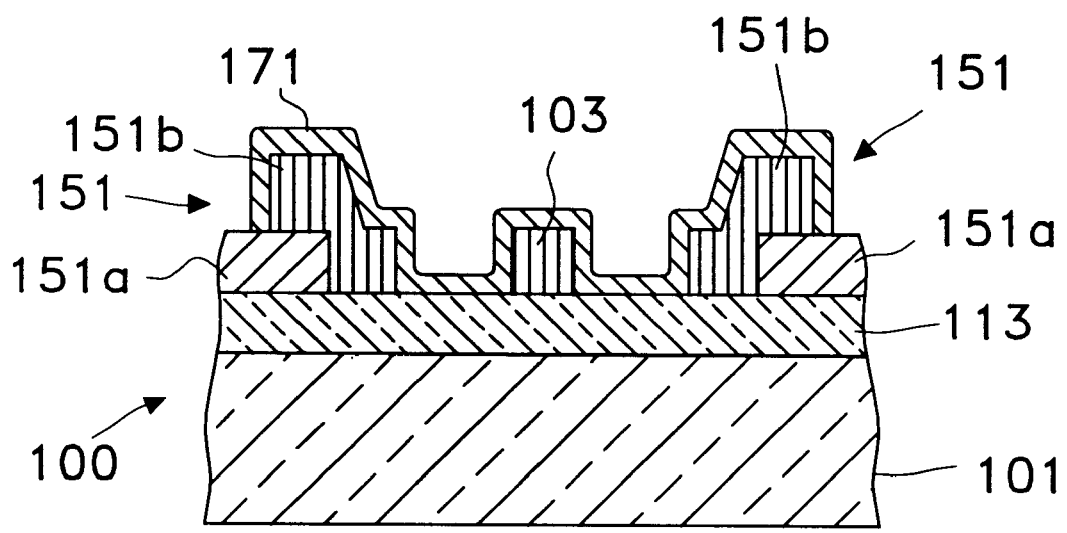
FIG. 9 is a sectional view of a signal line and pixel electrodes formed on an array substrate by another manufacturing method of the invention.

A second embodiment of the present invention will be explained hereinafter. The first embodiment of the liquid crystal display device discloses the signal line which has two laminated layers to maintain the constant relative position between the signal line and the pixel electrode and in which one of the layers is made in the same process as for the pixel electrode. The second embodiment has, however, pixel electrodes, the structure of which has multi-laminated layers. As shown in FIG. 9, the signal line 103 on the array substrate 100 consists of a single layer while the pixel electrodes are made of a plurality of layers, e.g., double conductive layers 151a and 151b.

In the array substrate with this structure, first, an ITO layer coated on the gate insulation layer 113 is subjected to the patterning process identical to the one described above in order to make a first layer 151a of the pixel electrode 151.

An aluminum layer is then formed on the first layer 151a and the gate insulation layer 113. The patterning process is applied to the aluminum layer 151a and the insulation layer 113 between the layers 151a in order to make the signal line 103 and a second layer 151b. This second layer 151b includes one portion formed on the edge portion of the first layer 151a, and another provided substantially in parallel with, and opposite to, the signal line 103 on the insulation layer 113.

After the aluminum layer is formed on the part of the first layer 151a and the insulation layer 113 between the neighboring first layers 151a, the patterning is performed for the formed aluminum layer by using the same mask through the same optical exposure process. The mask is designed to position the mask substantially in the center between the signal line 103 and the second layers 151b.

Thus, even where the first layer 151a of the pixel electrode 151 is made by patterning independently of the signal line 103 and is different in relative position therefrom, the distance between the second layer 151b and the signal line 103 is substantially constant in all the display areas corresponding optical exposure regions because they are made by the same patterning process using the same mask.

Even if the signal line 103 is shifted with respect to the first layer 151a in making the signal line 103, that shift is tolerable so long as the signal line 103 is formed between the pixel electrodes 151 and the first and second layers 151a and 151b are electrically connected to each other as shown in FIG. 9. This structure can maintain the constant relative position or distance between the signal line 103 and the pixel electrode 151.

The parasitic capacitance defined between the signal line 103 and the pixel electrode 151 is also kept substantially constant in all of the display areas. According to the second embodiment of this invention, the brightness difference in each display area and the unevenness of resultant images in the vicinity of neighboring display areas are effectively suppressed so that an active matrix-type liquid crystal display device can be provided with better display dignity.

The embodiments are directed to the optical exposures by which patterning processes are respectively performed for a plurality of regions corresponding to a plurality of display areas of an array substrate. The present invention is also applied to the display area by means of an optical exposure using a single large size mask. Namely, where the optical exposures are performed separately for pixel layers and signal line layers, the distance therebetween is not constant due to distortion of the large mask and/or mechanical positioning errors of the optical exposure machine thereby causing the unevenness of an image and poor display dignity. In this particular case, the pixel electrode or the signal line made of a plurality of laminated layers can overcome those technical difficulties as in the cases described above in detail.

The present invention can provide an active matrix-type liquid crystal display device with better display dignity and no substantial unevenness of images and a method of making the same, and can improve significantly the yield rate thereof.

What we claim is:

1. An active matrix-type liquid crystal display device, comprising:
   an array substrate;
   a counter substrate provided opposite to said array substrate; and
   a liquid crystal layer held between said array and counter substrates, wherein said array substrate comprises;
   switching elements;
   a plurality of electrically conductive lines connected to said switching elements; and
   a plurality of pixel electrodes connected to said switching elements;
   wherein select components of either said conductive lines or said pixel electrodes are made of a pair of first and second layers which are connected to each other;
   said pair of first and second layers are wider in width than said second layers;
   said second layers are formed within the width of said pair of first and second layers; and
   remaining components of either said conductive lines or said pixel electrodes are disposed substantially an equal distance from said first layers.

2. The active matrix-type liquid crystal display device according to claim 1, wherein electric coupling between said conductive lines and said pixel electrodes is substantially determined by mutual positions of said first layers and said other components.

3. The active matrix-type liquid crystal display device according to claim 1, wherein said conductive lines are said select components and said pixel electrodes are said remaining components.

4. The active matrix-type liquid crystal display device according to claim 1, wherein said pixel electrodes are said select components and said conductive lines are said remaining components.

5. The active matrix-type liquid crystal display device according to claim 1, wherein said switching elements are thin film transistors.

6. The active matrix-type liquid crystal display device according to claim 1, wherein said first layers cover edges of said second layers to define a predetermined distance from said remaining components.

7. The active matrix-type liquid crystal display device according to claim 1, wherein said remaining components and said first layers are formed by using a patterning process using a same mask pattern.

8. An active matrix-type liquid crystal display device, comprising:
   an array substrate;
   a counter substrate provided opposite to said array substrate; and
   a liquid crystal layer held between said array and counter substrates;
   said array substrate including,
   thin film transistors,
   a plurality of electrically conductive signal lines connected to said thin film transistors,
   a plurality of electrically conductive scanning lines connected to said thin film transistors,
   a plurality of pixel electrodes connected to said thin film transistors,
   wherein said signal and scanning lines are disposed to cross each other,
   said signal lines include first and second layers,
   said first layers are wider in width than said second layers,
   said second layers are disposed within said pair of first and second layers, and
   said pixel electrodes are disposed to be substantially an equal distance from said first layers.

9. The active matrix-type liquid crystal display device according to claim 8, wherein electric coupling between said signal lines and said pixel electrodes is substantially determined by relative positions of said first layers and said pixel electrodes.

10. The active matrix-type liquid crystal display device according to claim 8, wherein said pixel electrode, and said first layers are formed by using a patterning process using a same mask pattern.

11. An active matrix-type liquid crystal display device, comprising:
    an array substrate;
    a counter substrate provided opposite to said array substrate; and
    a liquid crystal layer held between said array and counter substrates;
    said array substrate having,
    thin film transistors,
    a plurality of electrically conductive signal lines connected to said thin film transistors,
    a plurality of electrically conductive scanning lines connected to said thin film transistors, and
    a plurality of pixel electrodes connected to said thin film transistors,
    wherein said signal and scanning lines are disposed to cross each other,
    said pixel electrodes include first and second layers,
    said first layers are wider in width than said second layers,
    said second layers are disposed within said first layers, and said signal lines are disposed to be substantially an equal distance from said first layers.

12. The active matrix-type liquid crystal display device according to claim 11, wherein electric coupling between said signal lines and said pixel electrodes is substantially determined by relative positions of said first layers and said signal lines.

13. The active matrix-type liquid crystal display device according to claim 11, wherein said first layers cover edges of said second layers and define substantially a predetermined distance from said pixel electrodes.

14. The active matrix-type liquid crystal display device according to claim 11, wherein said signal line and said first layers are formed by using a patterning process using a same mask pattern.

* * * * *